(12) United States Patent
Kim et al.

(10) Patent No.: US 12,122,234 B2
(45) Date of Patent: Oct. 22, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventors: Sungwang Kim, Seoul (KR); Minjae Park, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 224 days.

(21) Appl. No.: 17/528,995

(22) Filed: Nov. 17, 2021

(65) Prior Publication Data

US 2022/0250472 A1  Aug. 11, 2022

(30) Foreign Application Priority Data

Feb. 10, 2021  (KR) .......................... 10-2021-0018983

(51) Int. Cl.
| | |
|---|---|
| *B60K 35/00* | (2024.01) |
| *B60K 35/29* | (2024.01) |
| *G06F 3/023* | (2006.01) |
| *G06F 3/04847* | (2022.01) |
| *B60K 35/10* | (2024.01) |

(52) U.S. Cl.
CPC ............ *B60K 35/00* (2013.01); *G06F 3/0233* (2013.01); *G06F 3/04847* (2013.01); *B60K 35/10* (2024.01); *B60K 35/29* (2024.01); *B60K 2360/137* (2024.01); *B60K 2360/188* (2024.01)

(58) Field of Classification Search
CPC .............. B60K 35/00; B60K 2370/188; B60K 2370/137; G06F 3/0233; G06F 3/04847
See application file for complete search history.

(56) References Cited

U.S. PATENT DOCUMENTS

| | | | |
|---|---|---|---|
| 8,552,992 B1 * | 10/2013 | Kim ...................... | G06F 40/274 345/173 |
| 2004/0030807 A1 * | 2/2004 | Wessler .................. | G06F 1/169 710/1 |
| 2007/0296704 A1 * | 12/2007 | Park ...................... | G06F 3/0481 345/169 |
| 2009/0156255 A1 * | 6/2009 | Shin ....................... | H04B 1/385 455/575.6 |

(Continued)

FOREIGN PATENT DOCUMENTS

KR  10-1969838 B1  4/2019

*Primary Examiner* — Jennifer N Welch
*Assistant Examiner* — Reji Kartholy
(74) *Attorney, Agent, or Firm* — Morgan, Lewis & Bockius LLP

(57) ABSTRACT

The vehicle includes a display, a dial input device configured to receive a first input from a user, and a controller configured to control the display based on the first input, wherein the controller is configured to control the display to display a plurality of characters, a first indicator indicating one character among the plurality of characters, and a second indicator indicating at least one character not indicated by the first indicator among the plurality of characters, controls the display to change the characters indicated by the first indicator and the second indicator based on the first input, and determines the character indicated by the first indicator as the character selected by the user based on the second input.

7 Claims, 11 Drawing Sheets

(56) References Cited

U.S. PATENT DOCUMENTS

| | | | |
|---|---|---|---|
| 2012/0082306 A1* | 4/2012 | Hulse | G06F 21/36 380/28 |
| 2016/0077730 A1* | 3/2016 | Shim | B60K 35/00 715/773 |
| 2016/0314527 A1* | 10/2016 | Rosenberg | G06F 3/04847 |
| 2019/0012004 A1* | 1/2019 | Kim | G06F 3/0481 |

* cited by examiner

1400 : 1401~1410

VEHICLE AND CONTROL METHOD THEREOF

CROSS-REFERENCE TO RELATED APPLICATION(S)

The present application claims priority to Korean Patent Application No. 10-2021-0018983, filed on Feb. 10, 2021, the entire contents of which is incorporated herein for all purposes by this reference.

BACKGROUND OF THE INVENTION

Field of the Invention

The present invention relates to a vehicle and a control method thereof, and more particularly, to a vehicle and a control method thereof capable of being controlled such that only a user may know what characters to be actually input are when the user inputs a password into the vehicle.

Description of Related Art

In general, a vehicle refers to a moving or transport means that travels on a road or track using fossil fuels, electricity, or the like as a power source.

Recently, a vehicle capable of providing various additional services is being developed in consideration of user convenience and safety. A vehicle includes various electric devices to protect a driver and provide convenience and fun to the driver.

For example, recently a vehicle has a built-in display. The vehicle may display various control screens related to the control of various devices or screens related to additional functions executable in a navigation device on the display.

Furthermore, the user may control a screen displayed on the display by manipulating an input device such as a dial provided in the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a control method thereof configured for displaying on a display an indicator indicating a character to be actually input and an indicator for confusing other person when a user inputs a password into a terminal device of the vehicle so that the risk of exposing the password to be input by the user to the other person may be prevented.

Additional aspects of the present invention will be set forth in part in the description which follows, and in part, will be obvious from the description, or may be learned by practice of the present invention.

In accordance with an aspect of the present invention, a vehicle includes a display, a dial input device configured to receive a first input from a user, and a controller configured to control the display based on the first input, wherein the controller is configured to control the display to display a plurality of characters, a first indicator indicating one character among the plurality of characters, and a second indicator indicating at least one character not indicated by the first indicator among the plurality of characters, controls the display to change the characters indicated by the first indicator and the second indicator based on the first input, and determines the one character indicated by the first indicator as a character selected by the user when the controller concludes that the first input received by the dial input device satisfies a predetermined condition.

The controller may be configured to determine the one character indicated by the first indicator as the character selected by the user when a preset time elapses after the controller receives the first input from the dial input device.

The dial input device may receive a second input from the user, and the controller may be configured to determine the character indicated by the first indicator as the character selected by the user based on the second input.

The controller may be configured to control the display to display the first indicator visually differently from the second indicator.

The controller may be configured to control the display to move the first indicator and the second indicator in a direction corresponding to the first input based on the first input.

The controller may be configured to control the display to arrange and display the plurality of characters in a shape of a circle.

The controller may be configured to control the display to arrange and display the plurality of characters arranged in the shape of the circle at arbitrary positions.

The controller may be configured to control the display to change the characters indicated by the first indicator and the second indicator by moving the first indicator in a rotation direction corresponding to the first input and moving a position of the second indicator in a same direction as the rotation direction.

The controller may be configured to control the display to change the characters indicated by the first indicator and the second indicator by moving the plurality of characters arranged in the shape of the circle in the rotation direction corresponding to the first input.

The vehicle may further include a direction key provided to receive a third input from the user, wherein the controller may be configured to control the display to display a plurality of indicators and determines one indicator corresponding to the third input among the plurality of indicators as the first indicator.

The controller may be configured to control the display to display the first indicator in a color different from a color of the second indicator.

The vehicle may further include a driver display, wherein the controller may be configured to control the driver display to display color information of the first indicator.

The controller may be configured to control the display to display the first indicator and the second indicator as a predetermined type of characters.

The controller may be configured to control the display so that second indicators displayed as a plurality of different characters indicate all characters not indicated by the first indicator among the plurality of characters, respectively.

The first input may be an input by which a dial of the dial input device is rotated.

In accordance with an aspect of the present invention, a method of controlling a vehicle includes receiving a first input from a user by a dial input device, controlling a display based on the first input, controlling the display to display a plurality of characters, a first indicator indicating one character among the plurality of characters, and a second indicator indicating at least one character not indicated by the first indicator among the plurality of characters, controlling the display to change the characters indicated by the first indicator and the second indicator based on the first input, and determining the one character indicated by the first indicator as a character selected by the user when the controller concludes that the first input received by the dial input device satisfies a predetermined condition.

The determining of the character indicated by the first indicator as the character selected by the user may include determining the one character indicated by the first indicator as the character selected by the user when a preset time elapses after the controller receives the first input from the dial input device.

The control method may further include receiving a second input from the user, wherein the determining of the character indicated by the first indicator as the character selected by the user may include determining the character indicated by the first indicator as the character selected by the user based on the second input.

The controlling of the display to display the first indicator and the second indicator may include controlling the display to display the first indicator visually differently from the second indicator.

The controlling the display to change the characters indicated by the first indicator and the second indicator may include controlling the display to move the first indicator and the second indicator in a direction corresponding to the first input based on the first input.

The control method may further include controlling the display to arrange and display the plurality of characters in a shape of a circle.

The control method may further include controlling the display to arrange and display the plurality of characters arranged in the shape of the circle at arbitrary positions.

The controlling the display to change the characters indicated by the first indicator and the second indicator may include controlling the display to change the characters indicated by the first indicator and the second indicator by moving a position of the first indicator in a rotation direction corresponding to the first input and moving a position of the second indicator in a same direction as the rotation direction.

The controlling the display to change the characters indicated by the first indicator and the second indicator may include controlling the display to change the characters indicated by the first indicator and the second indicator by moving the plurality of characters arranged in the shape of the circle in the rotation direction corresponding to the first input.

The control method may further include receiving a third input from the user by a direction key, controlling the display to display a plurality of indicators, and determining one indicator corresponding to the third input among the plurality of indicators as the first indicator.

The controlling of the display to display the first indicator and the second indicator may include controlling the display to display the first indicator in a color different from a color of the second indicator.

The control method may further include controlling a driver display to display color information of the first indicator.

The controlling of the display to display the first indicator and the second indicator may include controlling the display to display the first indicator and the second indicator as a predetermined type of characters.

The controlling of the display to display the first indicator and the second indicator may include controlling the display so that second indicators displayed as a plurality of different characters indicate all characters not indicated by the first indicator among the plurality of characters, respectively.

The receiving of the third input from the user by the dial input device may include receiving an input by which a dial of the dial input device is rotated.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

These and/or other aspects of the present invention will become apparent and more readily appreciated from the following description of the embodiments, taken in conjunction with the accompanying drawings of which.

Figure 1:
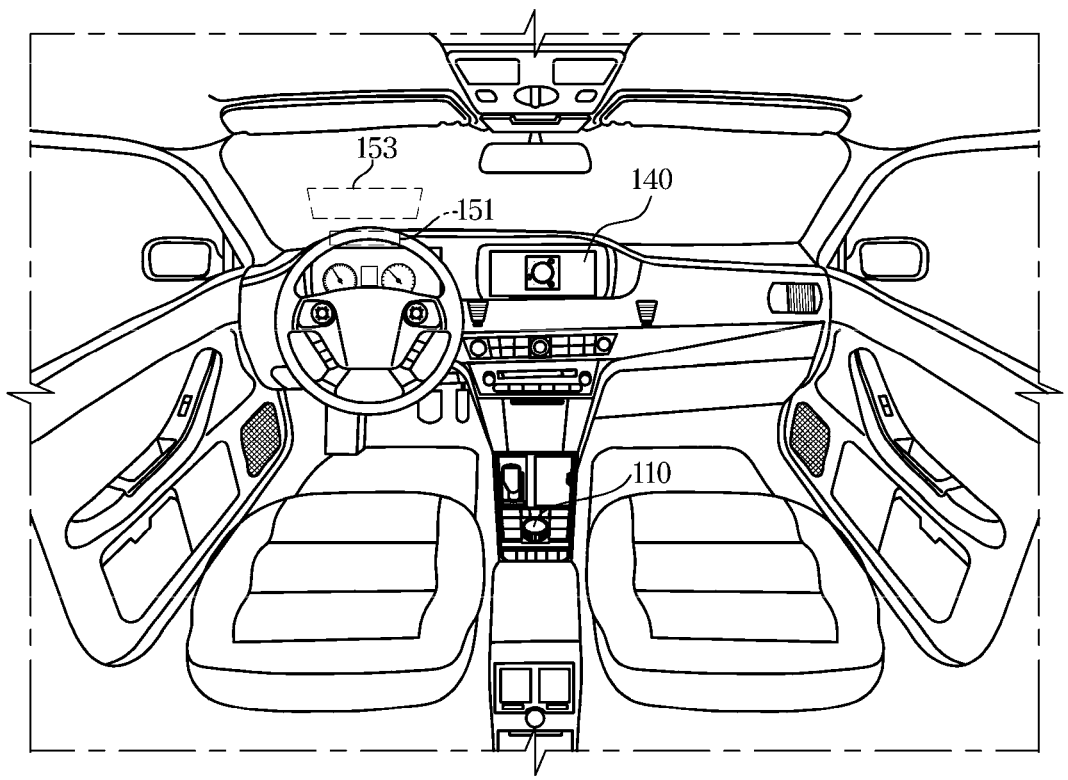
FIG. 1 is a perspective view exemplarily illustrating the interior of a vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Throughout the specification, like reference numerals refer to like elements. The present specification does not describe all the elements of the embodiments, and duplicative contents between general contents or embodiments in the technical field of the disclosure will be omitted. The terms 'part,' 'module,' 'member,' and 'block' used in the exemplary embodiment may be embodied as software or hardware, and it is also possible for a plurality of 'parts,' 'modules,' 'members,' and 'blocks' to be embodied as one component, or one 'part,' 'module,' 'member,' and 'block' to include a plurality of components according to exemplary embodiments.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

In the exemplary embodiment, it will also be understood that when an element is referred to as being "on" or "over" another element, it may be directly on the other element or intervening elements may also be present.

The terms 'first,' etc. are used to distinguish one element from another element, and the elements are not limited by the above-mentioned terms.

The singular forms "a", "an," and "the" include plural referents unless the context clearly dictates otherwise.

In each step, an identification numeral is used for convenience of explanation, the identification numeral does not describe the order of the steps, and each step may be performed differently from the order specified unless the context clearly states an order.

Hereinafter, the present invention will be described in detail with reference to the accompanying drawings.

Figure 2:
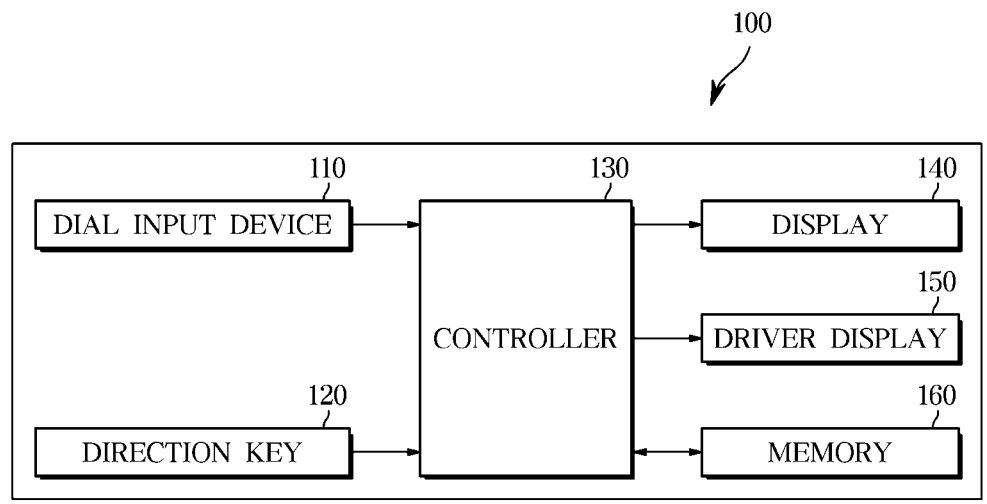
FIG. 2 is a control block diagram of the vehicle according to various exemplary embodiments of the present invention.

FIG. 1 is a perspective view exemplarily illustrating the interior of a vehicle according to various exemplary embodiments of the present invention, and FIG. 2 is a control block diagram of the vehicle according to an exemplary embodiment of the present invention.

Referring to FIG. 1 and FIG. 2, a vehicle 100 may include a dial input device 110, a direction key 120, a controller 130, a display 140, a driver display 150, a head up display (HUD) 151, a memory 160, and the like.

A dashboard and a gearbox may be provided inside the vehicle 100. The gearbox may be generally provided between a driver seat and a passenger seat inside the vehicle 100, and a gear stick for shifting and various parts related to shifting may be provided or built in the gearbox.

The dial input device 110 may be provided on a gearbox in the vehicle 100. The dial input device 110 may have various parts related to operation therein. A rotation shaft member to which the dial input device 110 is rotatably coupled and various parts related thereto, for example, a bearing, may be provided inside the dial input device 110.

Furthermore, various semiconductor chips and printed circuit boards may be provided inside the dial input device 110. The semiconductor chip may be mounted on the printed circuit board. The semiconductor chip may perform information processing or store data. The semiconductor chip may interpret a predetermined electrical signal generated according to the movement of the dial input device 110 or manipulation of a button formed on the dial input device 110, and may generate a predetermined control signal according to the analyzed content and then transmit the generated control signal to the controller 130.

The dial input device 110 may include a dial rotatably provided to receive a first input from a user, and a button provided inside the dial to receive a second input from the user.

The dial may be provided to be rotatable about one axis located at the center portion thereof as a central axis, and may transmit a signal depending on a degree of rotation.

Continuously formed protrusions may be provided on a surface of the dial to increase a frictional force. Accordingly, the protrusions prevent a finger of the user from slipping therefrom, improving operability.

The dial and the button provided in the dial input device 110 may be implemented as a hard key type having a mechanical structure as described above, but may be implemented as a soft key type to receive a command through a touch input method.

The dial input device 110 may receive the first input and the second input from the user. The first input may be a manner in which the dial of the dial input device 110 is rotated to be input. The second input may be a manner in which the button of the dial input device 110 is pressed or touched to be input.

The display 140 may be provided on a center panel of the dashboard. The display 140 may provide various pieces of information as images to a driver or a passenger of the vehicle 100. For example, the display 140 may visually provide various pieces of information such as a map, weather, news, various moving images or still images, and various pieces of information related to states or operations of the vehicle 100.

When the user inputs a password while looking at a screen of the display 140, the display 140 may display a plurality of characters 1400. In the instant case, the user may select a character to be input as the password among the plurality of characters 1400 displayed through the input device.

The display 140 may display an indicator 1420 indicating one of the plurality of characters 1400 displayed, and the user may move a position of the indicator 1420 to indicate another character instead of the character originally indicated by the indicator 1420 through the input device. Also, the user may select the character indicated by the indicator 1420 as the password to be input through the input device.

On the other hand, in the case of the related art, in a case where other person is in the vehicle together, when the user inputs a password based on the screen displayed on the display, the input password may be exposed to the other person. That is, in the case of the related art, there may be a problem that other person may see the indicator indicating the character to be selected by the user.

The controller 130 may control the display 140 based on the first input and the second input inputted by the user through the dial input device 110.

The controller 130 may control the display 140 to display the plurality of characters 1400. The plurality of characters 1400 may be candidates for the character to be input by the user.

The controller 130 may control the display 140 to display a first indicator 1421 indicating one character among the plurality of characters 1400.

The first indicator 1421 may be configured to provide visual information to the user by being displayed on the screen of the display 140 so that a character to be actually input by the user may be selected.

The controller 130 may control the display 140 to change the character indicated by the first indicator 1421 based on the first input, and may determine the character indicated by the first indicator 1421 as the character selected by the user when the input received by the dial input device 110 satisfies a predetermined condition.

That is, the user may move the position of the first indicator 1421 so that the first indicator 1421 indicates another character instead of the originally indicated character by inputting the first input to the dial input device 110. Also, the user may select the character indicated by the first indicator 1421 as the password to be inputted by inputting an input satisfying the predetermined condition to the dial input device 110.

Satisfying the predetermined condition may be that a preset time elapses after the dial input device 110 receives the first input. In the instant case, when the preset time elapses after the user moves the position of the first indicator 1421 so that the first indicator 1421 indicates another character instead of the originally indicated character by inputting the first input, the controller 130 may determine the character currently indicated by the first indicator as the character selected by the user.

On the other hand, satisfying the predetermined condition may be that the dial input device 110 receives the second input. In the instant case, when the user inputs the second input to the dial input device 110, the controller 130 may determine the character currently indicated by the first indicator as the character selected by the user.

As described above, satisfying the predetermined condition may be that the preset time elapses after the dial input device 110 receives the first input or may be that the dial input device 110 receives the second input, but is limited thereto.

The controller 130 may control the display 140 to display the second indicator 1422 indicating at least one character not indicated by the first indicator 1421 among the plurality of characters 1400. In the instant case, the one or more second indicators 1422 may be provided.

The second indicator 1422 may be configured to be displayed on the screen of the display 140 so that other person may not know the character to be input by the user even when the other person sees the screen of the display 140.

The controller 130 may control the display 140 to change the character indicated by the second indicator 1422 based on the first input. In the instant case, the positions of the first indicator 1421 and the second indicator 1422 may be changed at the same time, and a direction in which the position of the second indicator 1422 changes may correspond to a direction in which the position of the first indicator 1421 changes.

That is, the controller 130 may control the display 140 such that both the first indicator 1421 and the second indicator 1422 move in a direction corresponding to the first input inputted by the user when the dial input device 110 receives the first input.

Because both the first indicator 1421 and the second indicator 1422 are simultaneously moved in the direction corresponding to the first input, other person may not be able to distinguish the first indicator 1421 from the second indicator 1422 only by the movement of the first indicator 1421 and the second indicator 1422.

When the input received by the dial input device 110 satisfies the predetermined condition, the controller 130 may determine the character indicated by the first indicator 1421 as the character selected by the user regardless of the character indicated by the second indicator 1422.

The controller 130 may control the display 140 to display the first indicator 1421 differently from the second indicator 1422. That is, the user may distinguish the first indicator 1421 from the second indicator 1422 based on the visual information displayed on the display 140 and information that the user knows in advance, in the instant case, the user may know the information on the first indicator 1421 in advance and distinguish the first indicator 1421 from the second indicator 1422, but other person may not be able to distinguish the first indicator 1421 from the second indicator 1422 based only on the information displayed on the display 140.

The controller 130 for performing the above-described operations or operations to be described later may be implemented as the at least one memory 160 for storing an algorithm for controlling the operations of components inside the vehicle 100 or data for a program reproducing the algorithm and at least one processor for performing the above-described operations using data stored in the at least one memory 160.

The memory 160 may store a program for performing the above-described operations and operations to be described later, and the processor may execute the stored program. When a plurality of memories 160 and the processors are provided, they may be integrated into one chip or may be provided in physically separate locations. The memory 160 may include a volatile memory for temporarily storing data such as a Static Random Access Memory (S-RAM) and a D-RAM (Dynamic Random Access Memory). Also, the memory 160 may include a non-volatile memory for long-term storage of control programs and control data such as a Read Only Memory (ROM), an Erasable Programmable ROM (EPROM), and an Electrically Erasable Programmable ROM (EEPROM). The processor may include various logic circuits and arithmetic circuits, process data according to a program provided from the memory 160, and generate a control signal according to the processing result.

The components of the vehicle 100 according to an exemplary embodiment have been described above. Various components included in the vehicle 100 may communicate with each other through a vehicle communication network. The vehicle communication network may employ communication protocols such as a Media Oriented Systems Transport (MOST) having a communication speed up to 24.5 Mega-bits per second (Mbps), a RexRay having a communication speed up to 10 Mbps, a Controller Area Network (CAN) having a communication speed of 125 kilo-bits per second (kbps) to 1 Mbps, and a Local Interconnect Network (LIN) having a communication speed of 20 kbps. Such a vehicle communication network may employ not only a single communication protocol such as the MOST, FlexRay, CAN, and UN, but also a plurality of communication protocols.

Figure 3A:
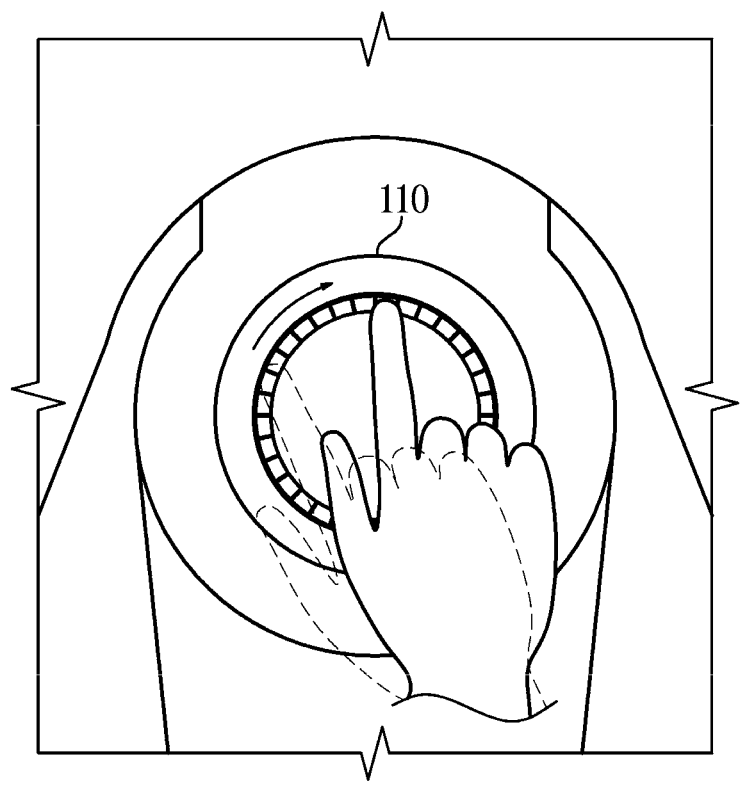
FIG. 3A is a view exemplarily illustrating a user inputting a first input to a dial input device according to various exemplary embodiments of the present invention.
Figure 3B:
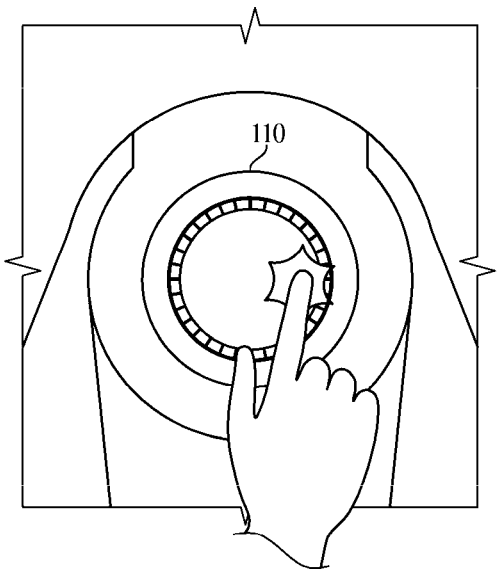
FIG. 3B is a view exemplarily illustrating a user inputting a second input to a dial input device according to various exemplary embodiments of the present invention.

FIG. 3A is a view exemplarily illustrating a user inputting a first input to a dial input device according to an exemplary embodiment and FIG. 3B is a view exemplarily illustrating a user inputting a second input to a dial input device according to various exemplary embodiments of the present invention;

Referring to FIG. 3A, the user may input the first input by rotating the dial.

When the dial is the hard key type, the user may input the first input by directly rotating the dial of the dial input device 110.

When the dial is the soft key type, the user may input the first input by moving a finger of the user along the surface of the dial in a desired rotation direction while touching the surface of the dial and then releasing the touch.

Referring to FIG. 3B, the user may input the second input by pressing or touching the button of the dial input device 110.

When the user drives the vehicle 100, a distance between the user and the display 140 may be a problem for inputting a character by touching a surface of the display 140. In the instant case, a gaze of the user may be a problem because the user needs to input the character while looking at the position of the finger of the user.

However, when the dial input device 110 is used as illustrated in FIG. 3A and FIG. 3B, the user may select a character to be input from among the plurality of characters 1400 displayed on the display 140 through the dial input device 110 while focusing more on driving and securing a forward gaze, and may input the selected character.

Figure 4:
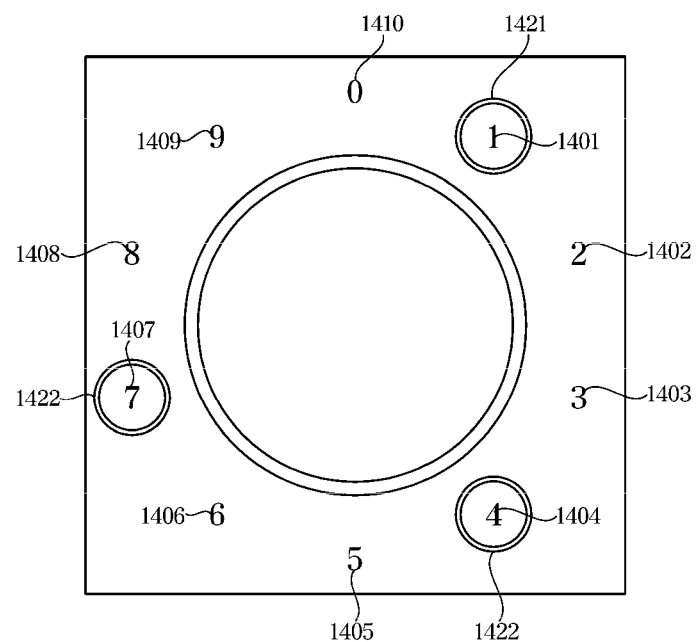
FIG. 4 is a view exemplarily illustrating an exemplary embodiment in which a first indicator and second indicators are displayed in different colors.

FIG. 4 is a view exemplarily illustrating an exemplary embodiment in which the first indicator and the second indicators are displayed in different colors.

Referring to FIG. 4, the controller 130 may control the display 140 such that the plurality of characters 1400 is arranged and displayed in a shape of a circle.

For example, the controller 130 may control the display 140 such that the numbers 1400 from 0 to 9 are arranged and displayed in a shape of a circle.

The controller 130 may control the display 140 such that the first indicator 1421 indicates one character among the plurality of characters 1400. For example, the first indicator 1421 may be displayed to indicate number 1 among a plurality of numbers.

The controller 130 may control the display 140 such that the second indicator 1422 indicates at least one character not indicated by the first indicator 1421 among the plurality of characters 1400. In the instant case, a plurality of second indicators 1422 may be provided. For example, two of the second indicators 1422 may be provided, one of the two second indicators 1422 may be displayed to indicate number 4, and the other may be displayed to indicate number 7.

The controller 130 may control the display 140 to display the first indicator 1421 in a color different from that of the second indicator 1422.

In the instant case, when the plurality of second indicators 1422 is provided, there may be a problem that anyone may distinguish the first indicator 1421 from the second indicators 1422 in a case where the colors of the second indicators 1422 are the same. That is, when the second indicators 1422 have a different color from the first indicator 1421 while the second indicators 1422 have the same color, anyone may find out that the only one indicator 1420 having a different color is the first indicator 1421. Therefore, when the plurality of second indicators 1422 is provided, it may be appropriate that the second indicators 1422 have different colors, respectively.

For example, the color of the first indicator 1421 may be blue, the second indicator 1422 indicating number 4 may be yellow, and the second indicator 1422 indicating number 7 may be green.

The color of the first indicator 1421 may be a color preset by the user when setting a password.

That is, because the user knows color information of the first indicator 1421 preset by the user, the user may know which indicator 1420 is the first indicator 1421 among the indicators 1420 displayed on the display 140, but other person may not be able to distinguish the first indicator 1421 from the second indicator 1422 only by the information displayed on the display 140.

For example, the user may set the color of the first indicator 1421 to blue in advance when setting a password. Thereafter, when the user inputs the password, the user may know that the blue indicator 1420 displayed on the display 140 is the first indicator 1421 because the user already knows that the color of the first indicator 1421 set by the user is blue, but other person may not be able to find out that the blue indicator 1420 is the first indicator 1421 only by the information displayed on the display 140.

Although in the exemplary embodiment of the present invention, the first indicator 1421 and the second indicator are indicated by a circular shape surrounding a specific number, a manner in which the first indicator 1421 and the second indicator 1422 indicate one character is not limited thereto, and as long as the user may know what the characters indicated by the first indicator 1421 and the second indicator 1422 are, the first indicator 1421 and the second indicator 1422 may be displayed in various manners.

Figure 5:
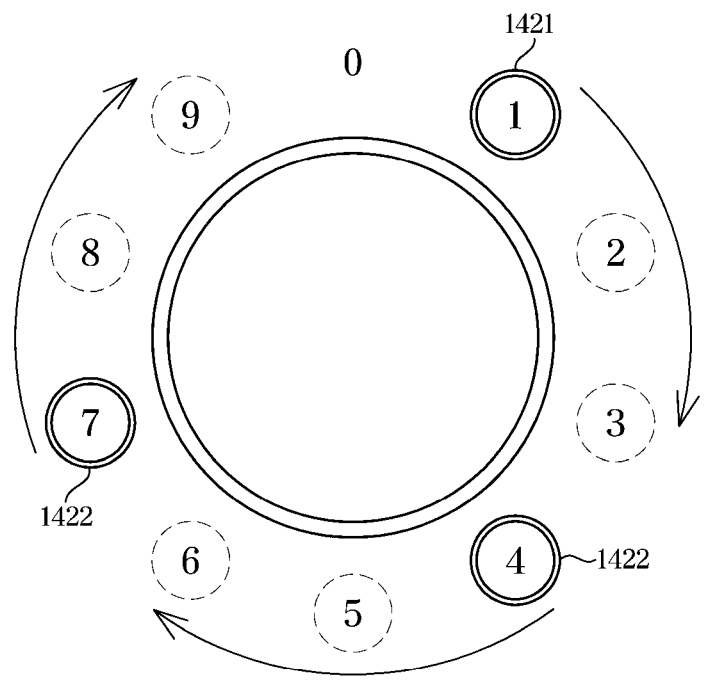
FIG. 5 is a view exemplarily illustrating an exemplary embodiment in which the indicators displayed in different colors based on the first input move.
Figure 5:
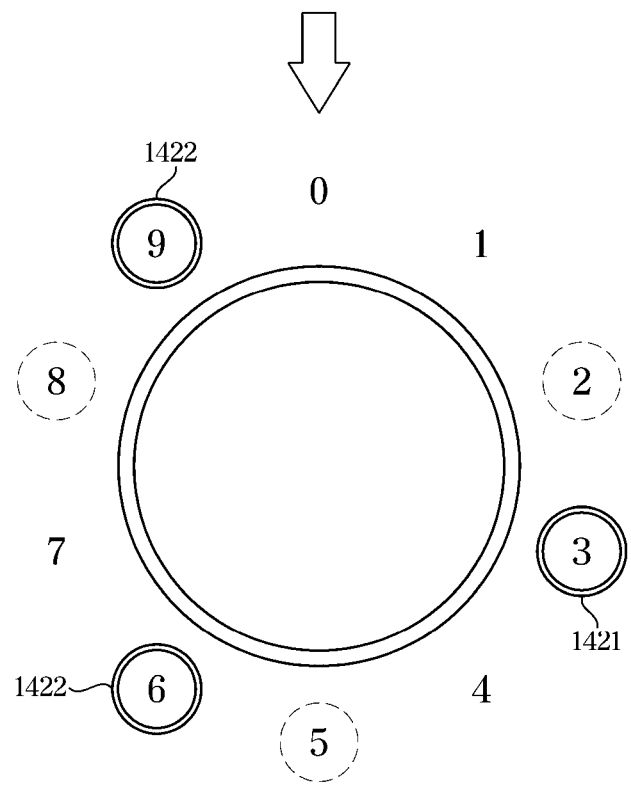

FIG. 5 is a view exemplarily illustrating an exemplary embodiment in which the indicators displayed in different colors based on the first input move.

Referring to FIG. 5, the controller 130 may control the display 140 such that both the first indicator 1421 and the second indicators 1422 move in the direction corresponding to the first input based on the first input.

For example, when the user rotates the dial clockwise, the controller 130 may control the display 140 to change the characters indicated by the first indicator 1421 and the second indicators 1422 by moving the first indicator 1421 and the second indicators 1422 in the same clockwise direction by the same position change.

When the user wants to input number 2 instead of number 1 currently indicated by the first indicator 1421, the user may rotate the dial, and in the instant case, the controller 130 may control the display 140 to indicate number 2 by moving the position of the first indicator 1421 clockwise by one space.

In the instant case, the controller 130 may also move the positions of the second indicators 1422 clockwise by one space. For example, the controller 130 may control the display 140 such that the second indicator 1422, which originally indicates number 4, indicates number 5, and the second indicator 1422, which originally indicates number 7, indicates number 8.

Furthermore, in the instant case, when the input received by the dial input device 110 satisfies the predetermined condition, the controller 130 may determine number 2 indicated by the first indicator 1421 as the character selected by the user.

The user may rotate the dial even when the user wants to input number 3 other than number 1 currently indicated by the first indicator 1421, and in the instant case, the controller 130 may control the display 140 to indicate number 3 by moving the position of the first indicator 1421 clockwise by two spaces.

In the instant case, the controller 130 may control the display 140 such that the second indicator 1422 originally indicating number 4 indicates number 6, and the second indicator 1422 originally indicating number 7 indicates number 9, by also moving the positions of the second indicators 1422 clockwise by two spaces.

Furthermore, in the instant case, when the input received by the dial input device 110 satisfies the predetermined condition, the controller 130 may determine number 3 indicated by the first indicator 1421 as the character selected by the user.

Figure 6:
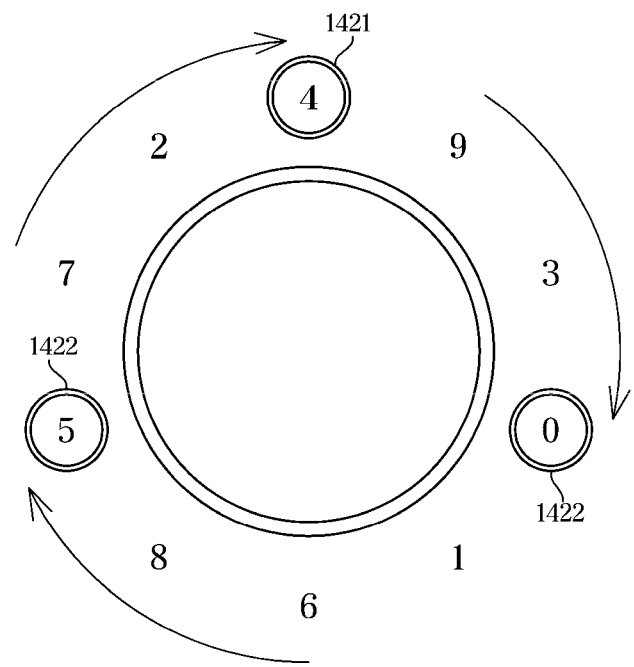
FIG. 6 is a view exemplarily illustrating an exemplary embodiment in which characters arranged in a circular shape move in a rotation direction corresponding to the first input.
Figure 6:
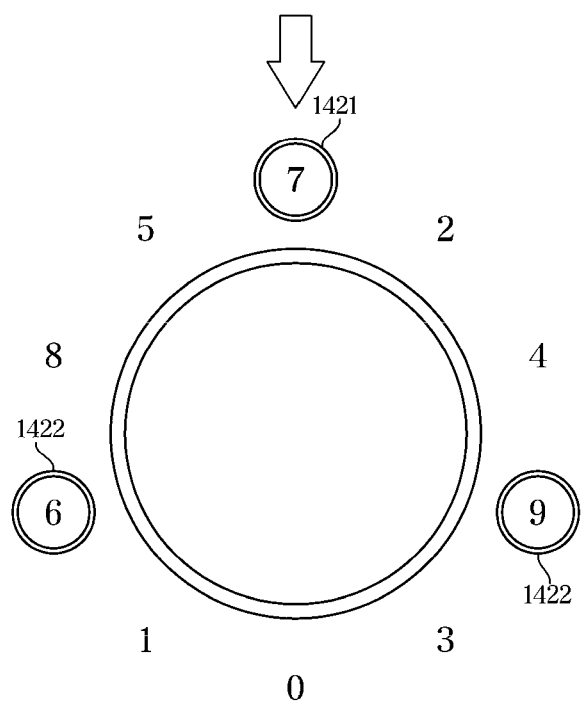

FIG. 6 is a view exemplarily illustrating an exemplary embodiment in which characters arranged in a circular shape move in a rotation direction corresponding to the first input.

Referring to FIG. 6, the controller 130 may control the display 140 to arrange and display the plurality of characters 1400 arranged in a circular shape at arbitrary positions. For example, the plurality of characters 1400 are not arranged in ascending or descending order from number 0 to number 9, but may be arranged in the order of number 0, number 1, number 6, number 8, number 5, number 7, number 2, number 4, number 9, and number 3 in a clockwise direction thereof.

The controller 130 may control the display 140 to change the characters indicated by the first indicator 1421 and the second indicators 1422 by moving the plurality of characters 1400 arranged in a circular shape in the rotation direction corresponding to the first input.

For example, when the user rotates the dial clockwise, the controller 130 may control the display 140 to change the characters indicated by the first indicator 1421 and the second indicators 1422 by moving all the displayed plurality of characters 1400 by the same space in the clockwise direction thereof.

When the user wants to input number 7 other than number 4, which is the character currently indicated by the first indicator 1421, the user may rotate the dial, and in the instant case, the controller 130 may control the display 140 such that the first indicator 1421 indicates number 7 by moving the positions of all the plurality of characters 1400 by two spaces in the clockwise direction thereof.

In the instant case, because the positions of all numbers are moved, the numbers indicated by the second indicator 1422 may also be changed.

Furthermore, in the instant case, when the input received by the dial input device 110 satisfies the predetermined condition, the controller 130 may determine number 7 indicated by the first indicator 1421 as the character selected by the user.

Figure 7:
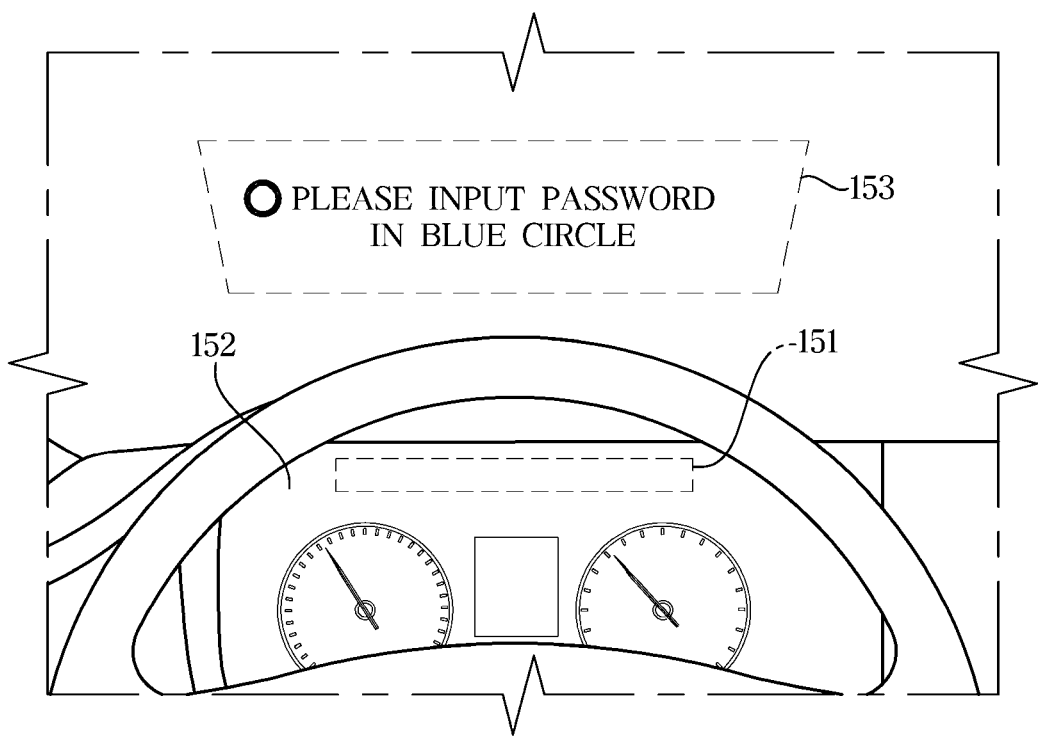
FIG. 7 is a view exemplarily illustrating a driver display displays color information of the first indicator.

FIG. 7 is a view exemplarily illustrating that the driver display displays color information of the first indicator.

Referring to FIG. 7, the driver display 150 may include the HUD 151 and a cluster 152.

The cluster 152 may be provided on the dashboard of the vehicle 100 to display driving information of the vehicle 100. For example, the cluster 152 may display overall details of the vehicle 100, such as a speed of the vehicle 100, an engine rotation speed, mileage, fuel condition, an external temperature, fuel efficiency, and a tire air pressure.

The HUD 151 may be provided on the dashboard of the vehicle 100 to output an image. The HUD 151 may be provided on one side of the dashboard to face a windshield of the vehicle 100. The image output by the HUD 151 may be displayed such that the image is reflected on a partial area 153 of the windshield of the vehicle 100.

The controller 130 may control the driver display 150 to display the color information of the first indicator 1421. That is, the controller 130 may control the cluster 152 or the HUD 151 to display the color information of the first indicator 1421.

For example, when the color of the first indicator 1421 is blue, the controller 130 may control the HUD 151 such that the phrase 'Please input the password in the blue circle' is displayed on the partial area 153 of the windshield. In the instant case, the controller 130 may control the HUD 151 to display a blue circle-shaped figure.

The user may know the color of the first indicator 1421 based on the information displayed by the driver display 150, and may distinguish the first indicator 1421 from the second indicators 1422.

The driver display 150 may be a screen that only the user who is the driver may see. That is, because no other person may know the information displayed on the driver display 150, only the user may recognize the color information of the first indicator 1421.

The display manner illustrated in FIG. 7 is only various exemplary embodiments of the present invention, and any display manner may be used as long as the color information of the first indicator 1421 may be displayed such that the user may know the color information of the first indicator 1421 while other person may not know the color information of the first indicator 1421.

Figure 8:
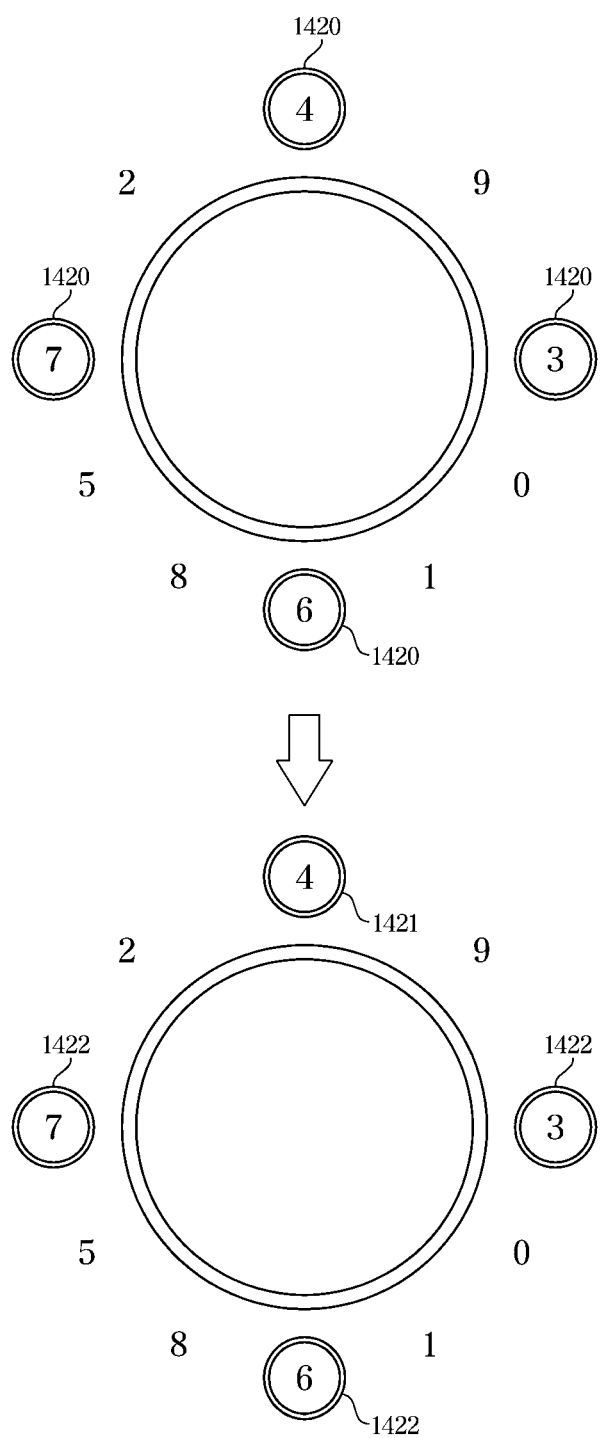
FIG. 8 is a view exemplarily illustrating that one indicator corresponding to a third input is determined as the first indicator among the indicators.

FIG. 8 is a view exemplarily illustrating that one indicator corresponding to a third input is determined as the first indicator among the indicators.

Referring to FIG. 8, the controller 130 may control the display 140 to display the plurality of indicators 1420. Also, the controller 130 may control the display 140 to arrange and display the plurality of characters 1400 arranged in a circular shape at arbitrary positions.

In the instant case, it may not matter whether the plurality of indicators 1420 have different colors or all have the same color. That is, the plurality of indicators 1420 displayed before the user manipulates the direction key 120 may be in a state in which the first indicator 1421 and the second indicators 1422 have not yet been specified.

The direction key 120 provided inside the vehicle 100 may receive a third input from the user.

The direction key 120 may include a button provided to receive a command for a direction the user intends to select. In the instant case, the direction key 120 may be implemented as the hard key type having a mechanical structure, or may be implemented as the soft key type to receive a command through a touch input method.

The third input may be a manner in which a button corresponding to a specific direction is pressed or touched to be input.

The controller 130 may determine one of the indicator 1420 corresponding to the third input among the plurality of indicators 1420 as the first indicator 1421.

For example, referring to FIG. 8, the controller 130 may control the display 140 to display four of the indicators 1420. In the instant case, the indicators 1420 may be displayed to indicate different characters by being positioned on an upper side, a left side, a right side, and a lower side, respectively.

The indicator 1420 indicating number 4 may be positioned on the upper side, the indicator 1420 indicating number 3 may be positioned on the right side, the indicator 1420 indicating number 6 may be positioned on the lower side, and the indicator 1420 indicating number 7 may be positioned on the left side thereof.

In the instant case, when the user manipulates the direction key 120 to input the third input corresponding to an upward direction, the controller 130 may determine the indicator 1420 corresponding to the upward direction as the first indicator 1421 and determine the remaining indicators 1420 as the second indicators 1422.

That is, in the instant case, the controller 130 may determine the indicator 1420 indicating number 4 as the first indicator 1421, and may determine the indicator 1420 indicating number 3, the indicator 1420 indicating number 6, and the indicator 1420 indicating number 7 as the second indicators 1422.

Even after the controller 130 determines the first indicator 1421 and the second indicators 1422 from among the plurality of indicators 1420, the first indicator 1421 may not still be displayed to be distinguished from the second indicators 1422.

Accordingly, even after the first indicator 1421 is determined, other person may still not be able to distinguish which indicator 1420 is the first indicator 1421 from among the plurality of indicators 1420.

However, because the user directly manipulates the direction key 120 to select the indicator 1420 located in the direction selected by the user as the first indicator 1421, the user may distinguish the first indicator 1421 from the second indicators 1422.

Figure 9:
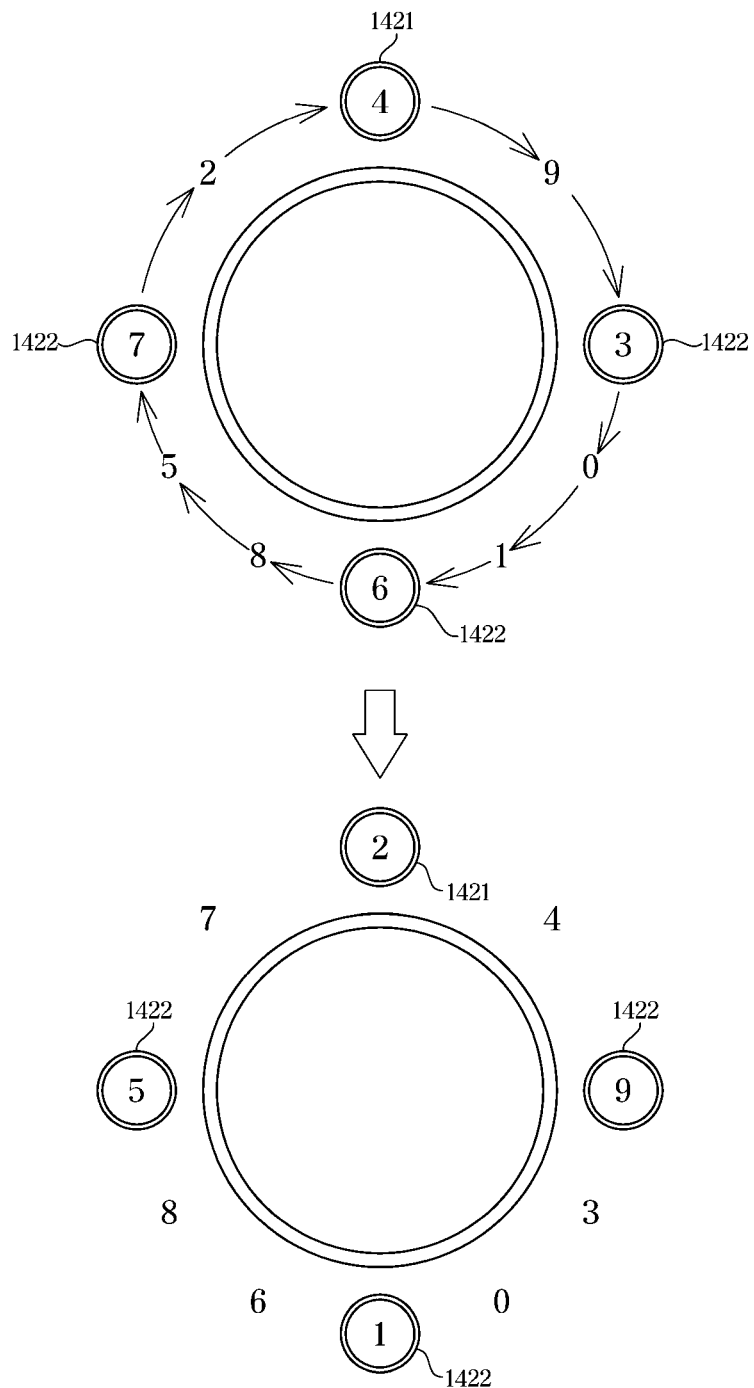
FIG. 9 is a view exemplarily illustrating another exemplary embodiment in which characters arranged in a circular shape move in the rotation direction corresponding to the first input.

FIG. 9 is a view exemplarily illustrating another exemplary embodiment in which characters arranged in a circular shape move in the rotation direction corresponding to the first input.

Referring to FIG. 9, the controller 130 may control the display 140 to change the characters indicated by the first indicator 1421 and the second indicators 1422 by moving the plurality of characters 1400 arranged in a circular shape in the rotation direction corresponding to the first input.

For example, when the user rotates the dial clockwise, the controller 130 may control the display 140 to change the characters indicated by the first indicator 1421 and the second indicators 1422 by moving all the plurality of displayed characters 1400 by the same space in the clockwise direction thereof.

When the user wants to input number 2 other than number 4, which is the character currently indicated by the first indicator 1421, the user may rotate the dial, and in the instant case, the controller 130 may control the display 140 such that the first indicator 1421 indicates number 2 by moving the positions of all the plurality of characters 1400 by one space in the clockwise direction thereof.

In the instant case, because the positions of all numbers are moved, the numbers indicated by the second indicators 1422 may also be changed.

Furthermore, in the instant case, when the input received by the dial input device 110 satisfies the predetermined condition, the controller 130 may determine number 2 indicated by the first indicator 1421 as the character selected by the user.

Figure 10:
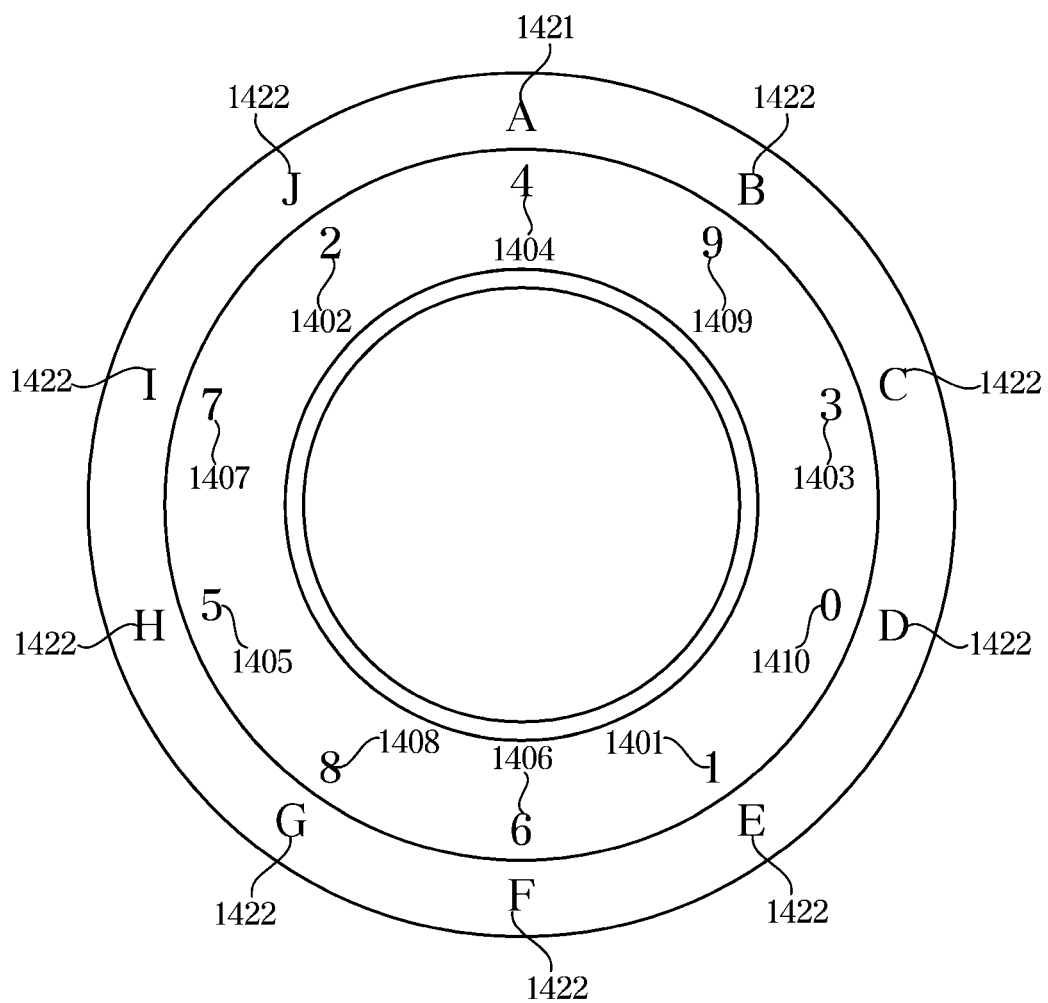
FIG. 10 is a view exemplarily illustrating that the first indicator and the second indicators are displayed as specific types of characters.

FIG. 10 is a view exemplarily illustrating that the first indicator and the second indicators are displayed as specific types of characters.

Referring to FIG. 10, the controller 130 may control the display 140 to arrange and display the plurality of characters 1400 arranged in a circular shape at arbitrary positions. Also, the controller 130 may control the display 140 to display the first indicator 1421 and the second indicators 1422 as specific type of characters 1400.

For example, the controller 130 may control the display 140 to display the first indicator 1421 and the second indicators 1422 as alphabets.

In the instant case, the user may set in advance when setting the password what alphabet the first indicator 1421 is to be displayed.

For example, in a case where the user selects the alphabet A as the first indicator 1421 when setting the password, only the alphabet A may be determined as the first indicator 1421, and all other alphabets may be determined as the second indicators 1422.

That is, because the user knows information on the alphabet selected as the first indicator 1421, the user may know which alphabet among the alphabets displayed on the display 140 is the first indicator 1421, while other person may not be able to distinguish the first indicator 1421 from the second indicators 1422 only by the information displayed on the display 140.

The controller 130 may control the display 140 such that all the characters not indicated by the first indicator 1421 among the plurality of characters 1400 are indicated by the second indicators 1422 displayed as a plurality of different characters, respectively.

For example, when the character indicated by the alphabet A, which is the first indicator 1421, is number 4, the character indicated by the alphabet B may be number 9, the character indicated by the alphabet C may be number 3, the character indicated by the alphabet D may be number 0, the character indicated by the alphabet E may be number 1, the character indicated by the alphabet F may be number 6, the character indicated by the alphabet G may be number 8, the character indicated by the alphabet H may be number 5, the character indicated by the alphabet I may be number 7, and the character indicated by the alphabet J may be number 2.

Figure 11:
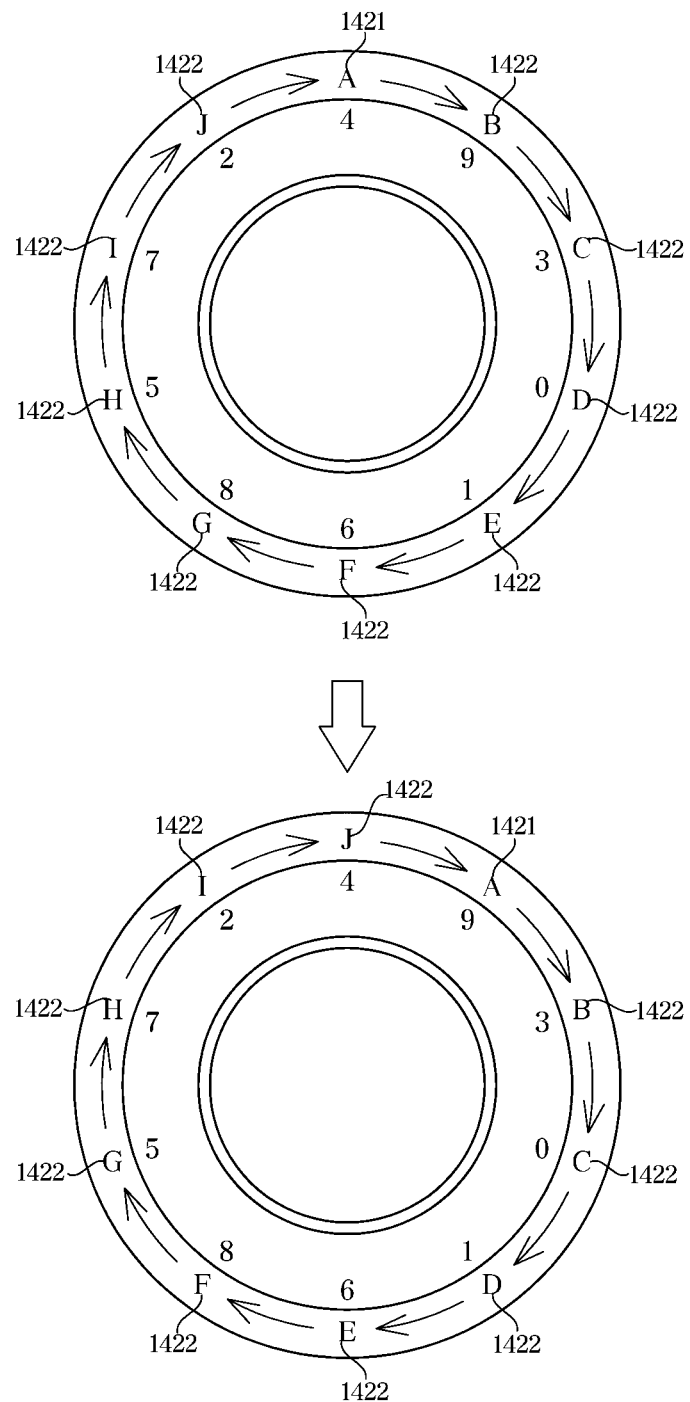
FIG. 11 is a view exemplarily illustrating an exemplary embodiment in which the indicators displayed as the specific types of characters based on the first input move.

FIG. 11 is a view exemplarily illustrating an exemplary embodiment in which the indicators displayed as the specific types of characters based on the first input move.

Referring to FIG. 11, the controller 130 may control the display 140 such that all of the first indicator 1421 and the second indicators 1422 based on the first input move in the direction corresponding to the first input.

For example, when the user rotates the dial clockwise, the controller 130 may control the display 140 to change the characters indicated by the first indicator 1421 and the second indicators 1422 by moving the first indicator 1421 and the second indicators 1422 by the same position change in the same clockwise direction thereof.

When the user wants to input number 9 other than number 4 currently indicated by the alphabet A, which is the first indicator 1421, the user may rotate the dial, in the instant case, the controller 130 may control the display 140 to indicate number 9 by moving the position of the first indicator 1421 by one space in the clockwise direction thereof.

In the instant case, the controller 130 may also move the positions of the second indicators 1422 by one space in the clockwise direction thereof. For example, the controller 130 may control the display 140 such that the second indicator 1422, which is displayed as the alphabet B and originally indicates number 9, indicates number 3, and the second indicator 1422, which is displayed as the alphabet C and originally indicates number 3, indicates number 0.

Furthermore, in the instant case, when the input received by the dial input device 110 satisfies the predetermined condition, the controller 130 may determine number 9 indicated by the alphabet A, which is the first indicator 1421, as the character selected by the user.

Also, the controller 130 may control the display 140 to change the characters indicated by the respective alphabets by moving the plurality of characters 1400 arranged in a circular shape in the rotation direction corresponding to the first input.

At least one component may be added or deleted depending on the performances of the components described above. Furthermore, it will be readily understood by those of ordinary skill in the art that the mutual positions of the components may be changed depending on the performance or structure of a system.

Figure 12:
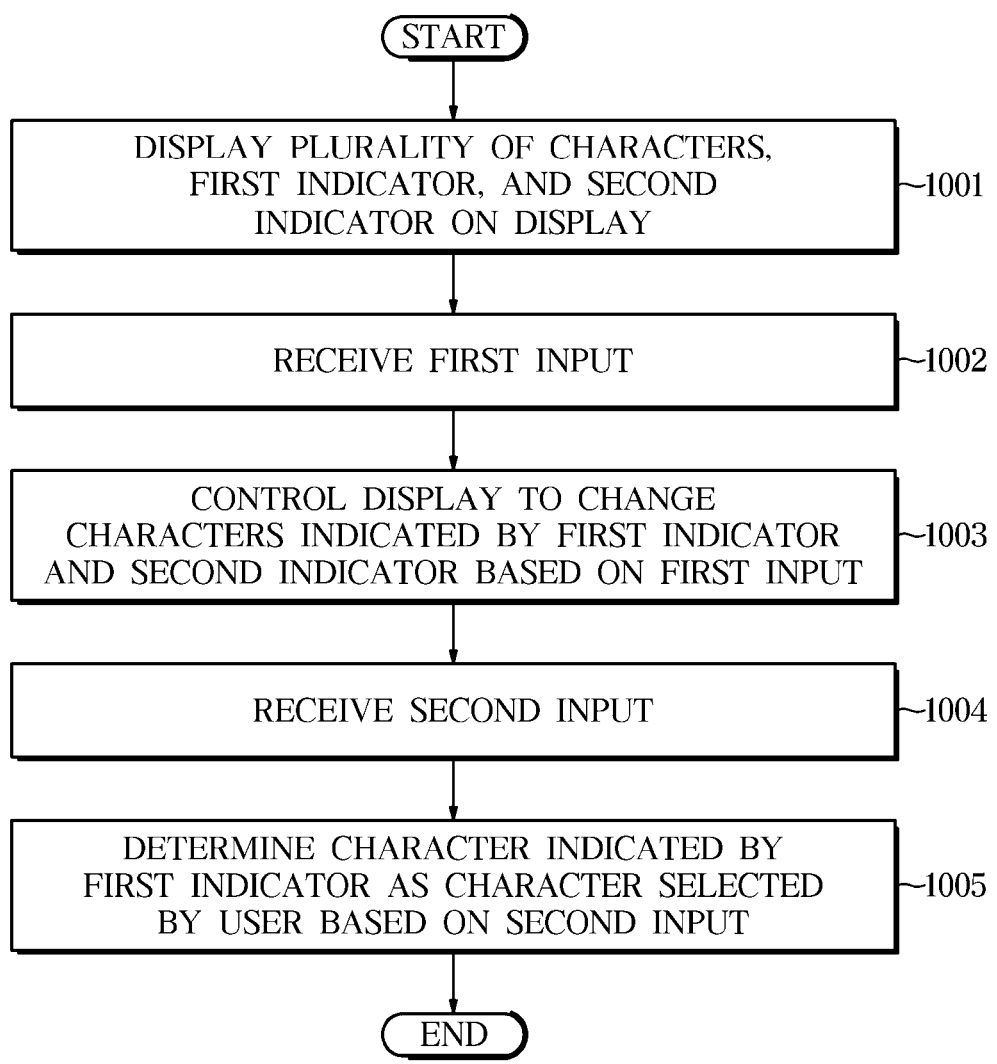
FIG. 12 is a flowchart illustrating a control method of the vehicle according to an exemplary embodiment of the present invention.

FIG. 12 is a flowchart illustrating a control method of the vehicle according to an exemplary embodiment of the present invention. The present control method is only an exemplary embodiment for achieving the purpose of the present invention, and some components may be added or deleted as necessary.

Referring to FIG. 12, the display 140 may display the plurality of characters 1400, the first indicator 1421, and the second indicator 1422 (1001).

In the instant case, the controller 130 may control the display 140 to display the plurality of characters 1400, the first indicator 1421 indicating one character among the plurality of characters 1400, and the second indicator 1422 indicating at least one character not indicated by the first indicator 1421.

In the instant case, the controller 130 may control the display 140 to display the first indicator 1421 visually differently from the second indicator 1422 and to arrange and display the plurality of characters 1400 in a shape of a circle.

Also, the controller 130 may control the display 140 to arrange and display the plurality of characters 1400 arranged in a circular shape at arbitrary positions.

The dial input device 110 may receive the first input from the user (1002). In the instant case, the dial input device 110 may transmit a signal corresponding to the first input to the controller 130.

The first input may be a manner in which the dial of the dial input device 110 is rotated to be input, and the user may rotate the dial of the dial input device 110 to move the configuration displayed on the display 140 as much as the user wants.

The controller 130 may control the display 140 to change the characters indicated by the first indicator 1421 and the second indicator 1422 based on the first input (1003).

According to various exemplary embodiments of the present invention, the controller 130 may, based on the first input, control the display 140 such that both the first indicator 1421 and the second indicator 1422 move in the direction corresponding to the first input.

According to another exemplary embodiment of the present invention, the controller 130 may, based on the first input, control the display 140 to change the characters indicated by the first indicator 1421 and the second indicator 1422 by moving the plurality of characters 1400 arranged in a circular shape in the rotation direction corresponding to the first input.

The dial input device 110 may receive the second input from the user (1004). In the instant case, the dial input device 110 may transmit a signal corresponding to the second input to the controller 130.

The user may press or touch the button of the dial input device 110 to input the character currently indicated by the first indicator 1421.

The controller 130 may determine the character indicated by the first indicator 1421 as the character selected by the user based on the second input (1005).

A process in which the user inputs the first input and the second input through the dial input device 110 may be repeated until all characters to be input by the user are input.

As described above, the controller 130 may determine the character indicated by the first indicator 1421 as the character selected by the user based on the second input, but even in a case where the preset time elapses after the dial input device 110 receives the first input, the controller 130 may determine the character indicated by the first indicator 1421 as the character selected by the user.

That is, the condition for determining the character currently indicated by the first indicator 1421 as the character selected by the user may be that the preset time elapses after the dial input device 110 receives the first input or that the dial input device 110 receives the second input, as described above, but is not limited thereto.

As is apparent from the above, the present invention can provide a vehicle and a control method thereof configured for displaying a plurality of indicators such that when a user inputs a password into a terminal device of the vehicle, other person cannot know which indicator indicates a character to be actually input while the user can know the indicator.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a dial input device including a rotatable dial and a button provided inside the dial;
   a first display configured to display a plurality of characters;
   a second display; and
   a controller configured to control the first display and the second display,
   wherein the controller is configured to:
      control the first display to display a first indicator indicating one character among the plurality of characters, and a second indicator visually different from the first indicator and indicating another character not indicated by the first indicator among the plurality of characters,
      control the second display to display an information guiding a user to use one of the first indicator or the second indicator to select at least one character among the plurality of characters,
      control the first display to move both the first indicator and the second indicator in a direction corresponding to a first input according to a rotation of the rotatable dial
      control the first display to change the characters indicated by the first indicator and the second indicator according to the first input, and
      after the second display displays the information guiding the user to use the first indicator, in response to receiving a second input according to a pressure or touch of the button or in response to a preset time being elapsed after receiving the first input, determine the one character indicated by the first indicator, not by the second indicator, as a character selected by the user,
      wherein one character indicated by the first indicator among the plurality of characters is able to be indicated by the second indicator when the first indicator indicates another character among the plurality of characters.

2. The vehicle of claim 1, wherein the controller is configured to control the first display to arrange and display the plurality of characters in a shape of a circle.

3. The vehicle of claim 2, wherein the controller is configured to control the first display to arrange and display the plurality of characters arranged in the shape of the circle at arbitrary positions.

4. The vehicle of claim 2, wherein the controller is configured to control the first display to change the characters indicated by the first indicator and the second indicator by moving the plurality of characters arranged in the shape of the circle in the rotation direction corresponding to the first input.

5. The vehicle of claim 4, further including:
   a direction key configured to receive a third input from the user,
   wherein the controller is configured to determine one indicator corresponding to the third input among the first indicator and the second indicator as an indicator for the user to use to select at least one character among the first indicator and the second indicator.

6. The vehicle of claim 1, wherein the controller is configured to control the first display to display the first indicator and the second indicator as a predetermined type of characters.

7. A method of controlling a vehicle, the method comprising:
   receiving, by a controller, a first input according to a rotation direction of a dial included a dial input device;
   controlling, by the controller, a first display to display a first indicator indicating one character among a plurality of characters displayed to the display, and a second indicator visually different from the first indicator and indicating another character not indicated by the first indicator among the plurality of characters;
   controlling, by the controller, a second display different from the first display, to display an information guiding a user to use one of the first indicator or the second indicator to select at least one character among the plurality of characters;
   controlling, by the controller, the first display to move both the first indicator and the second indicator in a direction corresponding to the first input;
   controlling, by the controller, the first display to change the characters indicated by the first indicator and the second indicator according to the first input; and
   after the second display displays the information guiding the user to use the first indicator, in response to receiving a second input according to a pressure or touch of the dial input device or in response to a preset time being elapsed after receiving the first input, determining, by the controller, the one character indicated by the first indicator, not by the second indicator, as a character selected by the user,
   wherein one character indicated by the first indicator among the plurality of characters is able to be indicated by the second indicator when the first indicator indicates another character among the plurality of characters.

* * * * *